(12) United States Patent
Yu et al.

(10) Patent No.: US 10,440,164 B2
(45) Date of Patent: Oct. 8, 2019

(54) MOBILE TERMINAL FOR FINGERPRINT IDENTIFICATION

(71) Applicant: GUANGDONG OPPO MOBILE TELECOMMUNICATIONS CORP., LTD., Dongguan, Guangdong (CN)

(72) Inventors: Weibin Yu, Guangdong (CN); Jiao Cheng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/072,465

(22) PCT Filed: May 25, 2017

(86) PCT No.: PCT/CN2017/085943
§ 371 (c)(1),
(2) Date: Jul. 24, 2018

(87) PCT Pub. No.: WO2017/202367
PCT Pub. Date: Nov. 30, 2017

(65) Prior Publication Data
US 2019/0037060 A1    Jan. 31, 2019

(30) Foreign Application Priority Data
May 25, 2016    (CN) .................... 2016 2 0490931 U

(51) Int. Cl.
*H04W 4/02* (2018.01)
*H04W 76/15* (2018.01)
(Continued)

(52) U.S. Cl.
CPC .......... *H04M 1/026* (2013.01); *G06F 1/1626* (2013.01); *G06F 1/1637* (2013.01);
(Continued)

(58) Field of Classification Search
CPC .......... H04W 76/15; H04W 4/02; G06F 1/16; G06F 1/1637
(Continued)

(56) References Cited

U.S. PATENT DOCUMENTS 10,088,871 B2 * 10/2018 Cheng .................... G06F 1/1637
10,248,233 B2 *  4/2019 Cheng .................... G06F 1/1637
(Continued)

FOREIGN PATENT DOCUMENTS

CN    105159409 A    12/2015
CN    105225872 A    1/2016
(Continued)

OTHER PUBLICATIONS

English translation of CN 205193832 U, Feb. 8, 2019.*
(Continued)

*Primary Examiner* — William D Cumming
(74) *Attorney, Agent, or Firm* — Lathrop Gage LLP

(57) ABSTRACT

A mobile terminal capable of fingerprint identification includes a fingerprint identification module and a terminal screen. The terminal screen includes a display area and a non-display area located at an end of the display area, and the display area has a display surface. The fingerprint identification module is adjacent to the non-display area relative to the display area, a forward projection of the fingerprint identification module on a plane where the display surface is located is at least partially overlapped with a forward projection of the non-display area on the plane where the display surface is located.

20 Claims, 4 Drawing Sheets

(51) Int. Cl.
  *G06F 1/16* (2006.01)
  *H04M 1/02* (2006.01)
  *H04M 1/18* (2006.01)
  *G06K 9/00* (2006.01)

(52) U.S. Cl.
  CPC .......... *G06F 1/1658* (2013.01); *G06F 1/1684* (2013.01); *G06K 9/00053* (2013.01); *H04M 1/0266* (2013.01); *H04M 1/185* (2013.01)

(58) Field of Classification Search
  USPC .......................................................... 455/411
  See application file for complete search history.

(56) References Cited

U.S. PATENT DOCUMENTS

| | | | | |
|---|---|---|---|---|
| 10,289,155 | B2* | 5/2019 | Cheng | G06F 1/1637 |
| 10,306,033 | B1* | 5/2019 | Cheng | H04M 1/0266 |
| 2015/0381617 | A1* | 12/2015 | Jung | H04M 1/67 455/411 |
| 2017/0177032 | A1* | 6/2017 | Cheng | G06F 1/1637 |
| 2017/0276977 | A1* | 9/2017 | Li | G02F 1/1333 |
| 2018/0034948 | A1* | 2/2018 | Yu | G06F 1/1684 |
| 2018/0113605 | A1* | 4/2018 | Ji | G06F 21/32 |
| 2018/0196537 | A1* | 7/2018 | Cheng | G06F 1/1637 |
| 2018/0196560 | A1* | 7/2018 | Cheng | G06F 1/1626 |
| 2018/0197463 | A1* | 7/2018 | Cheng | G06F 1/1637 |
| 2018/0199446 | A1* | 7/2018 | Cheng | G06F 1/1637 |
| 2018/0199457 | A1* | 7/2018 | Cheng | G06F 1/1637 |
| 2018/0331163 | A1* | 11/2018 | Yang | G06F 1/1652 |
| 2018/0365472 | A1* | 12/2018 | Cai | G06K 9/209 |
| 2019/0037060 | A1* | 1/2019 | Yu | G06K 9/00053 |
| 2019/0037173 | A1* | 1/2019 | Lee | H04W 76/15 |
| 2019/0095684 | A1* | 3/2019 | Yu | G06K 9/00053 |
| 2019/0095685 | A1* | 3/2019 | Yu | G06F 1/16 |

FOREIGN PATENT DOCUMENTS

| | | |
|---|---|---|
| CN | 205038660 U | 2/2016 |
| CN | 105488499 A | 4/2016 |
| CN | 205193832 U | 4/2016 |
| CN | 205656556 U | 10/2016 |

OTHER PUBLICATIONS

English translation of CN 105488499 A, Feb. 8, 2019.*
PCT/CN2017/085943 English translation of International Search Report dated Aug. 2, 2017, 2 pages.
PCT/CN2017/085943 International Search Report and Written Opinion dated Aug. 2, 2017, 9 pages.
European Patent Application No. 17802213.3 extended Search and Opinion dated Feb. 11, 2019, 10 pages.

* cited by examiner

MOBILE TERMINAL FOR FINGERPRINT IDENTIFICATION

CROSS-REFERENCE TO RELATED APPLICATION

The present application is a national phase entry under 35 USC § 371 of International Application PCT/CN2017/085943, filed May 25, 2017, which claims the benefit of and priority to Chinese Patent Application No. 201620490931.9, filed May 25, 2016, the entire disclosures of which are incorporated herein by reference.

FIELD

Embodiments of the present application relate to a technical field of fingerprint identification, more particularly to a mobile terminal and a terminal capable of fingerprint identification.

BACKGROUND

With the continuous development of science and technology, a mobile terminal such as a mobile phone has become one of indispensable daily use tools, due to its rich functions and strong display effect. Currently, fingerprint functions such as fingerprint unlock, fingerprint payment gradually become common functions of the mobile terminal.

In the related art, since a driving circuit or the like needs to be packaged and arranged, a screen of the mobile terminal generally has a display area and a non-display area, and the non-display area is located at two ends of the display area. The non-display area is arranged opposite to an upper frame of the terminal, and a fingerprint identification module is centrally arranged relative to a lower frame of the terminal.

However, such a structure leads to that the upper frame of the mobile terminal is too large, the size of the whole machine needs to be lengthened and the appearance of the mobile terminal is influenced.

SUMMARY

Embodiments of the present application provide a mobile terminal capable of fingerprint identification. The mobile terminal includes a fingerprint identification module and a terminal screen; the terminal screen includes a display area and a non-display area located at an end of the display area, and the display area has a display surface; the fingerprint identification module is adjacent to the non-display area relative to the display area, a forward projection, on a plane where the display surface is located, of the fingerprint identification module is at least partially overlapped with a forward projection, on the plane where the display surface is located, of the non-display area.

Embodiments of the present application provide a further mobile terminal capable of fingerprint identification. The mobile terminal includes a fingerprint identification module and a terminal screen; the terminal screen includes a display area and a non-display area located at an end of the display area; the fingerprint identification module being adjacent to the non-display area relative to the display area, the fingerprint identification module being arranged opposite to the non-display area of the terminal screen.

Embodiments of the present application provide a terminal capable of fingerprint identification. The terminal includes a fingerprint identification module and a terminal screen; the terminal screen includes a display area and a non-display area located at an end of the display area, the display area having a display surface; the fingerprint identification module being adjacent to the non-display area relative to the display area, in a direction perpendicular to a plane where the display surface is located, the fingerprint identification module and the non-display area being at least partially overlapped.

DETAILED DESCRIPTION

Figure 1:
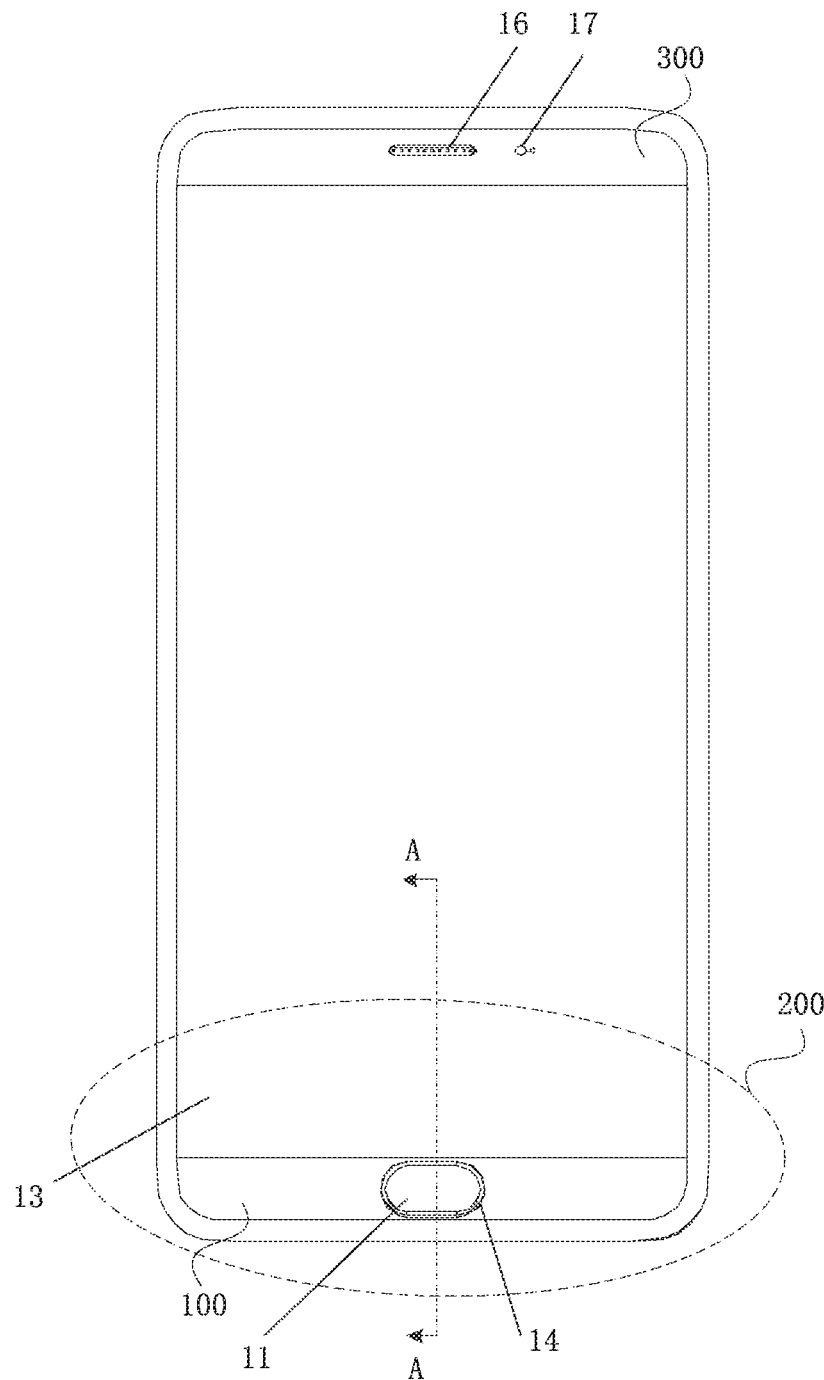
FIG. 1 is a schematic view of a mobile terminal according to an embodiment of the present application.

The present application will be further described in detail with reference to the drawings and embodiments in the following. It could be understood that, specific embodiments described herein are only for illustration of the present application and not limiting to the present application. It should be additionally noted that, for convenience of description, only a part of the structure related to the present application is illustrated in the drawings, rather than the whole structure.

Embodiments of the present application provide a mobile terminal capable of fingerprint identification. The mobile terminal includes a fingerprint identification module and a terminal screen; the terminal screen includes a display area and a non-display area located at an end of the display area, and the display area has a display surface; the fingerprint identification module is adjacent to the non-display area relative to the display area, a forward projection of the fingerprint identification module on a plane where the display surface is located is at least partially overlapped with a forward projection of the non-display area on the plane where the display surface is located.

Embodiments of the present application provide a further mobile terminal capable of fingerprint identification. The mobile terminal includes a fingerprint identification module and a terminal screen; the terminal screen includes a display area and a non-display area located at an end of the display area; the fingerprint identification module being adjacent to the non-display area relative to the display area, the fingerprint identification module being arranged opposite to the non-display area of the terminal screen.

Embodiments of the present application provide a terminal capable of fingerprint identification. The terminal includes a fingerprint identification module and a terminal screen; the terminal screen includes a display area and a non-display area located at an end of the display area, the display area having a display surface; the fingerprint identification module being adjacent to the non-display area relative to the display area, in a direction perpendicular to a plane where the display surface is located, the fingerprint identification module and the non-display area being at least partially overlapped.

Figure 2:
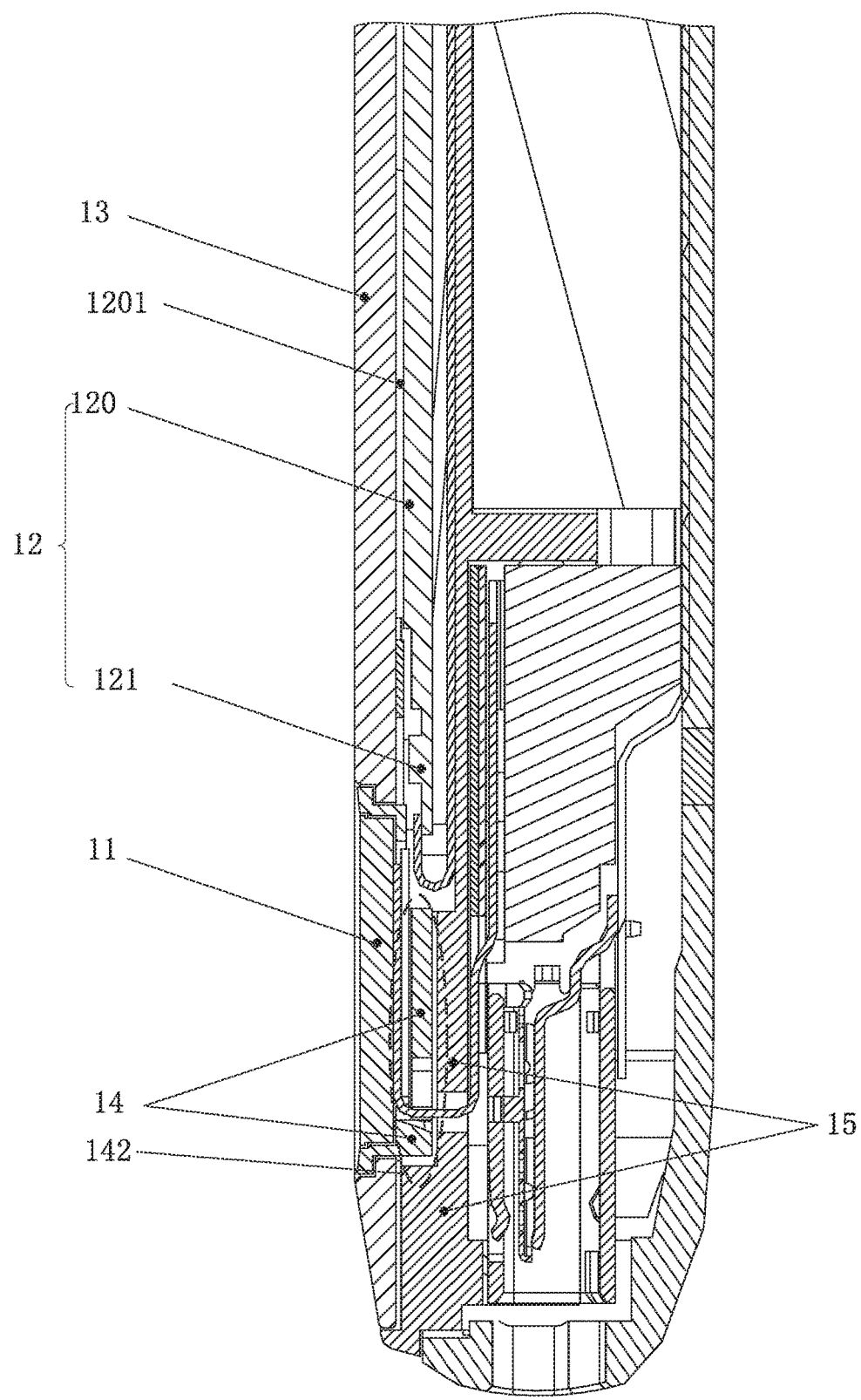
FIG. 2 is a partial sectional view of the mobile terminal taken along A-A in FIG. 1.

FIG. 1 is a schematic view of a mobile terminal according to an embodiment of the present application; FIG. 2 is a partial sectional view of the mobile terminal taken along A-A in FIG. 1. Referring to FIGS. 1 and 2, the mobile terminal includes a fingerprint identification module 11 and a terminal screen 12. The terminal screen 12 includes a display area 120 and a non-display area 121 located at an end of the display area 120. The display area 120 has a display surface 1201. The non-display area 121 is a portion of the terminal screen 12 and the portion is provided with a driving circuit. The fingerprint module 11 is arranged adjacent to the non-display area 121 relative to the display area 120. In some embodiments, the non-display area 121 is located at a lower frame 100 of the mobile terminal. The fingerprint identification module 11 is oriented to a front surface of the mobile terminal, i.e. a side of the mobile terminal for displaying. The fingerprint identification module 11 is arranged opposite to the non-display area 121 of the terminal screen 12.

The fingerprint identification module 11 is arranged opposite to the non-display area 121 of the terminal screen 12, that is, the fingerprint identification module 11 can be partially or completely overlapped with the non-display area 121 of the terminal screen 12. As illustrated in FIG. 2, the expression "being partially or completely overlapped" means that projections, on a plane where the front surface of the mobile terminal is located, of the fingerprint identification module 11 and the non-display area 121 of terminal screen 12 are partially or completely overlapped; in other words, a forward projection, on a plane where the display surface 1201 of the terminal screen 12 is located, of the fingerprint identification module 11 is at least partially overlapped with a forward projection, on this plane, of the non-display area 121; or in a direction perpendicular to the plane where the display surface 1201 is located, the fingerprint identification module 11 and the non-display area 121 are at least partially overlapped, which is not specifically limited and can be set according to a size of the non-display area 121, a size and a shape of the fingerprint identification module 11, and so on. In the present embodiment, the fingerprint identification module 11 is arranged opposite to the non-display area 121, such that it can be ensured that when the fingerprint identification module 11 is arranged at the front surface of the mobile terminal, the fingerprint identification module is centrally positioned relative to the lower frame 100 of the mobile terminal, that is, the fingerprint identification module is centered relative to upper and lower boundaries of the lower frame 100; furthermore, the terminal screen 12 is not required to be inverted, the lower frame 100 of the mobile terminal will not be too large, the size of the whole machine is not required to be lengthened, and expression of the appearance of the mobile terminal is also promoted.

It should be noted that, the lower frame 100 is an opaque region (an example of the first opaque portion) below a display region of the mobile terminal. The lower frame 100 of the mobile terminal is only exemplarily illustrated in FIG. 1, which does not limit the lower frame 100. Additionally, a position and a shape of the fingerprint identification module 11 are only exemplarily illustrated in FIG. 1, which does not limit the fingerprint identification module 11.

Figure 3:
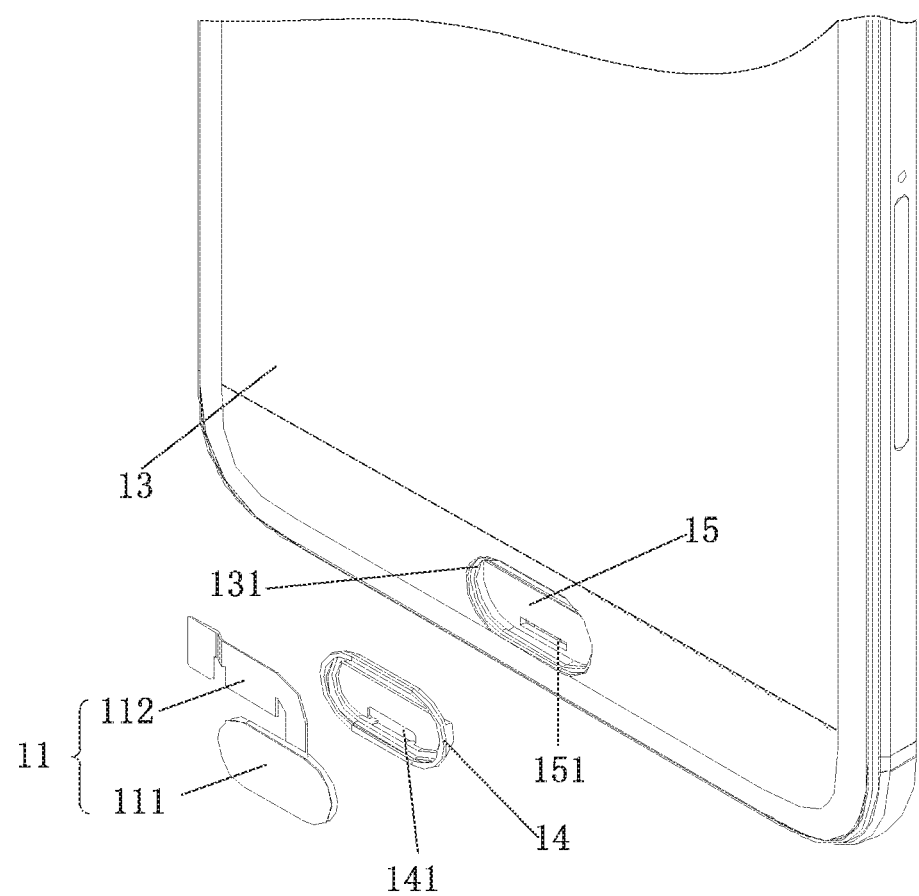
FIG. 3 is a partial enlarged view of a mobile terminal according to an embodiment of the present application.

Referring to FIGS. 1 and 2, the mobile terminal also includes a cover plate glass 13 arranged opposite to the terminal screen 12 and located at an outer side of the terminal screen 12. FIG. 3 is a partial enlarged view of a mobile terminal according to an embodiment of the present application, and FIG. 3 is a partial enlarged view of a region 200 in FIG. 1. Referring FIG. 3, the cover plate glass 13 defines a module accommodation hole 131 configured to accommodate the fingerprint identification module 11. Specifically, the cover plate glass 13 is arranged at the outer side of the terminal screen 12, which has a protection effect on the terminal screen 12 and the fingerprint identification module 11. Furthermore, the fingerprint identification module 11 is accommodated in the module accommodation hole 131. On the one hand, the fingerprint identification module 11 can be fixed, and on the other hand, the fingerprint identification module 11 will not occupy too much space of the mobile terminal, thereby ensuring that the mobile terminal has a thinner thickness.

Further, referring to FIGS. 1 and 2, the mobile terminal also includes a ring body 14 located between the fingerprint identification module 11 and the cover plate glass 13, and the ring body is fixed to the cover plate glass 13 and the fingerprint identification module 11 separately in a dispensing mode. Specifically, by providing the ring body 14, on the one hand, it can be ensured that the mobile terminal has a better appearance, having a decorative function; and on the other hand, it can have the protection effect on various components of the fingerprint identification module 11, and the fingerprint identification module 11 is allowed to be fixed to the cover plate glass 13 and other components of the mobile terminal better.

Further, the mobile terminal also includes an upper cover 15 arranged opposite to the terminal screen 12 and located at an inner side of the terminal screen 12. The upper cover 15 is fixed to the cover plate glass 13 in the dispensing mode. Specifically, by fixing the upper cover 15 to the cover plate glass 13, fixation and protection for components such as the terminal screen 12 and the fingerprint identification module 11 can be achieved.

Preferably, a bottom of the ring body 14 is fixed to the upper cover 15 in the dispensing mode. Referring to FIG. 2, the bottom of the ring body 14 has a sunk stage 142, and a bottom and a side of the sunk stage 142 is fixed to the upper cover 15 separately by dispensing. Since the upper cover 15 and the cover plate glass 13 are also usually fixed to the terminal screen 12 in the dispensing mode, by fixing the ring body 14 to the upper cover 15, the fingerprint identification module 11, the terminal screen 12, the cover plate glass 13, the ring body 14 and the upper cover 15 can be fixed more firmly, thereby having a better protection effect on the terminal screen 12 and avoiding a situation that the terminal screen 12 cracks and fails during a drop of the mobile terminal due to presence of movable components. Additionally, the cover plate glass 13, the fingerprint identification module 11, the ring body 14 and the upper cover 15 are fixed by dispensing, thereby ensuring that the fingerprint identification module 11 and the mobile terminal have a better water proof performance.

Specifically, referring to FIG. 3, the fingerprint identification module 11 includes a front panel 111 and a flexible printed circuit board 112, and the front panel 11 can be dual-used as a Home key of the mobile terminal. The front panel 111 is dual-used as the Home key, extending the function of the fingerprint identification module 11. Additionally, a shape of the front panel 111 may be a polygon, a circle or an ellipse. The polygon may be a quadrangle, a pentagon or the like, and the polygon may also be provided with a plurality of fillets. Specifically, by setting the front panel 111 to be various shapes, the expression of the appearance of the mobile terminal is promoted, and appearance requirements of different users can be satisfied, improving the user experience.

Additionally, the flexible printed circuit board 112 is connected to a control circuit of the mobile terminal through a first through hole 141 in the bottom of the ring body 14 and a second through hole 151 in the upper cover 15.

Specifically, referring to FIG. 1, the mobile terminal also includes a telephone receiver 16 and a light sensing hole 17 that are arranged in an upper frame 300 of the mobile terminal and centered relative to upper and lower boundaries of the upper frame 300. It should be noted that, the upper frame 300 is an opaque region (an example of the second opaque portion) above the display region of the mobile terminal. The upper frame is only exemplarily illustrated in the present embodiment, which does not limit the present embodiment.

Figure 4:
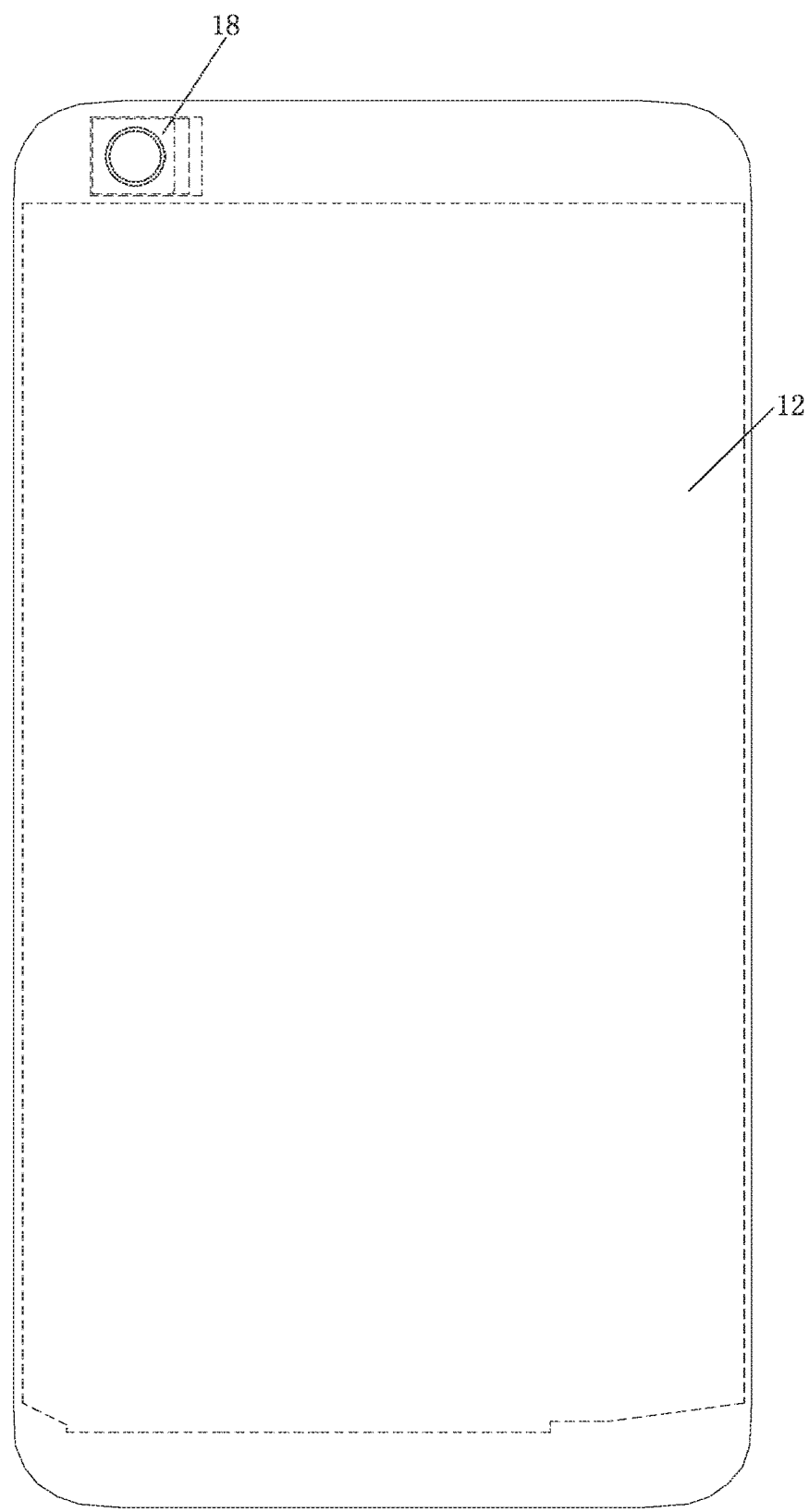
FIG. 4 is a schematic view of a rear surface of a mobile terminal according to an embodiment of the present application.

FIG. 4 is a schematic view of a rear surface of a mobile terminal according to an embodiment of the present application. Further, referring to FIG. 4, the mobile terminal also includes a camera 18 located at the rear surface of the mobile terminal, and the camera 18 is not overlapped with the terminal screen 12. Specifically, since the camera 18 is not overlapped with the terminal screen 12, the camera 18 will not protrude from a rear cover of the mobile terminal too much, such that not only the expression of the appearance of the product can be effectively promoted, but also the camera 18 can be protected better. It should be noted that, the dashed region in FIG. 4 only exemplarily illustrates contours of the camera 18 and the terminal screen 12, which is not specifically limited.

In the technical solution of the present embodiment, when the fingerprint identification module 11 is located at the front surface of the mobile terminal, the non-display area of the terminal screen is arranged opposite to the lower frame of the mobile terminal, and the fingerprint identification module is arranged opposite to the non-display area of the terminal screen, such that the upper frame and the lower frame of the mobile terminal will not be too large, and the size of the whole machine can be shortened; furthermore, the fingerprint identification module can be centrally arranged relative to the lower frame of the mobile terminal, the telephone receiver hole and the light sensing hole can be centered relative to the upper frame, and the main camera can be arranged in a staggered mode with respect to the terminal screen and will not protrude from the rear cover too much, thereby promoting the expression of the appearance of the mobile terminal.

It should be noted that, the above-described is only the preferred embodiments of the present application and the technical principle applied. It could be appreciated by those skilled in the art that, the present application is not limited by the particular embodiments described herein, various changes, readjustment and replacement can be made by those skilled in the art without departing from the protection scope of the present application. Therefore, although the present application is illustrated in detail through the above embodiments, the present application is not only limited to the above embodiments, more other equivalent embodiments can be included without departing from the concept of the present application, and the scope of the present application is determined by the scope of the attached claims.

What is claimed is:

1. A mobile terminal capable of fingerprint identification, comprising:
    a terminal screen and a first opaque portion arranged separately, a fingerprint identification module being arranged in the first opaque portion;
    the terminal screen comprising a display area and a non-display area located at an end of the display area, the display area having a display surface, the non-display area and the first opaque portion being arranged separately;
    the fingerprint identification module being adjacent to the non-display area relative to the display area, a forward projection, on a plane where the display surface is located, of the fingerprint identification module being at least partially overlapped with a forward projection, on the plane where the display surface is located, of the non-display area.

2. The mobile terminal capable of fingerprint identification according to claim 1, further comprising:
    a cover plate glass located at an outer side of the terminal screen;
    the cover plate glass defining a module accommodation hole configured to accommodate the fingerprint identification module.

3. The mobile terminal capable of fingerprint identification according to claim 2, further comprising:
    a ring body provided between the fingerprint identification module and the cover plate glass and fixed to the cover plate glass and the fingerprint identification module separately in a dispensing mode.

4. The mobile terminal capable of fingerprint identification according to claim 3, further comprising:
    an upper cover arranged opposite to the terminal screen and located at an inner side of the terminal screen;
    the upper cover being fixed to the cover plate glass in the dispensing mode.

5. The mobile terminal capable of fingerprint identification according to claim 4, wherein a bottom of the ring body is fixed to the upper cover in the dispensing mode.

6. The mobile terminal capable of fingerprint identification according to claim 5, wherein the bottom of the ring body has a sunk stage, and a bottom and a side of the sunk stage are fixed to the upper cover separately by dispensing.

7. The mobile terminal capable of fingerprint identification according to claim 4, wherein the fingerprint identification module comprises a front panel and a flexible printed circuit board; and the front panel is dual-used as a Home key of the mobile terminal.

8. The mobile terminal capable of fingerprint identification according to claim 7, wherein the flexible printed circuit board is connected to a control circuit of the mobile terminal through a first through hole in a bottom of the ring body and a second through hole in the upper cover.

9. The mobile terminal capable of fingerprint identification according to claim 4, wherein a shape of the front panel is a polygon, a circle or an ellipse.

10. The mobile terminal capable of fingerprint identification according to claim 9, wherein the polygon is provided with a plurality of fillets.

11. The mobile terminal capable of fingerprint identification according to claim 7, wherein a shape of the front panel is a quadrangle or a pentagon.

12. The mobile terminal capable of fingerprint identification according to claim 1, further comprising:
    a telephone receiver and a light sensing hole arranged in an upper frame of the mobile terminal and centered relative to upper and lower boundaries of the upper frame.

13. The mobile terminal capable of fingerprint identification according to claim 1, further comprising:
    a camera located at a rear surface of the mobile terminal, the camera and the terminal screen being not overlapped.

14. A mobile terminal capable of fingerprint identification, comprising:

a terminal screen and a first opaque portion arranged separately, a fingerprint identification module being arranged in the first opaque portion;

the terminal screen comprising a display area and a non-display area located at an end of the display area, the non-display area and the first opaque portion being arranged separately;

the fingerprint identification module being adjacent to the non-display area relative to the display area, the fingerprint identification module being arranged opposite to the non-display area of the terminal screen.

15. The mobile terminal capable of fingerprint identification according to claim 14, further comprising:

a cover plate glass located at an outer side of the terminal screen;

the cover plate glass defining a module accommodation hole configured to accommodate the fingerprint identification module.

16. The mobile terminal capable of fingerprint identification according to claim 15, further comprising:

a ring body provided between the fingerprint identification module and the cover plate glass and fixed to the cover plate glass and the fingerprint identification module separately in a dispensing mode.

17. A terminal capable of fingerprint identification, comprising:

a terminal screen and a first opaque portion arranged separately, a fingerprint identification module being arranged in the first opaque portion;

the terminal screen comprising a display area and a non-display area located at an end of the display area, the display area having a display surface, the non-display area and the first opaque portion being arranged separately;

the fingerprint identification module being adjacent to the non-display area relative to the display area, in a direction perpendicular to a plane where the display surface is located, the fingerprint identification module and the non-display area being at least partially overlapped.

18. The terminal capable of fingerprint identification according to claim 17, further comprising:

a cover plate glass located at an outer side of the terminal screen;

the cover plate glass defining a module accommodation hole configured to accommodate the fingerprint identification module.

19. The terminal capable of fingerprint identification according to claim 18, further comprising:

a ring body provided between the fingerprint identification module and the cover plate glass and fixed to the cover plate glass and the fingerprint identification module separately in a dispensing mode.

20. The terminal capable of fingerprint identification according to claim 19, further comprising:

an upper cover arranged opposite to the terminal screen and located at an inner side of the terminal screen;

the upper cover being fixed to the cover plate glass in the dispensing mode.

* * * * *